US012007638B2

(12) United States Patent
Deng et al.

(10) Patent No.: US 12,007,638 B2
(45) Date of Patent: Jun. 11, 2024

(54) DISPLAY PANEL AND PREPARATION METHOD THEREOF, AND DISPLAY DEVICE

(71) Applicant: WUHAN CHINA STAR OPTOELECTRONICS TECHNOLOGY CO., LTD., Wuhan (CN)

(72) Inventors: Qian Deng, Wuhan (CN); Rui He, Wuhan (CN); Wei Cheng, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/622,728

(22) PCT Filed: Dec. 15, 2021

(86) PCT No.: PCT/CN2021/138487
§ 371 (c)(1),
(2) Date: Dec. 24, 2021

(87) PCT Pub. No.: WO2023/102983
PCT Pub. Date: Jun. 15, 2023

(65) Prior Publication Data
US 2024/0036380 A1    Feb. 1, 2024

(30) Foreign Application Priority Data
Dec. 7, 2021 (CN) .......................... 202111511913.6

(51) Int. Cl.
*G02F 1/1334* (2006.01)
*G02F 1/13357* (2006.01)
*G02F 1/1343* (2006.01)

(52) U.S. Cl.
CPC .......... *G02F 1/1334* (2013.01); *G02F 1/1336* (2013.01); *G02F 1/134309* (2013.01)

(58) Field of Classification Search
CPC . G02F 1/134309; G02F 1/1336; G02F 1/1334
See application file for complete search history.

(56) References Cited

U.S. PATENT DOCUMENTS

| 4,938,568 A | * | 7/1990 | Margerum | ............ | G02F 1/1334 |
| | | | | | 427/213.3 |
| 2005/0259193 A1 | * | 11/2005 | Sumiyoshi | ............ | G02F 1/1323 |
| | | | | | 349/62 |

(Continued)

FOREIGN PATENT DOCUMENTS

| CN | 1702512 A | 11/2005 |
| CN | 201041608 Y | 3/2008 |

(Continued)

OTHER PUBLICATIONS

PCT International Search Report for International Application No. PCT/CN2021/138487, dated Jul. 29, 2022, 10pp.

(Continued)

*Primary Examiner* — Mariam Qureshi
(74) *Attorney, Agent, or Firm* — The Roy Gross Law Firm, LLC; Roy Gross

(57) ABSTRACT

Embodiments of the present application disclose a display panel and a preparation method thereof, and a display device. The display panel comprises a polymer liquid crystal cell and a light source. The polymer liquid crystal cell comprises a first region close to the light source and a second region away from the light source, and the second region has a higher haze than the first region, thereby reducing the light emitting intensity close to the light source region and increasing the light emitting intensity away from the light source region, so that light guide and light emitting in each region of the polymer liquid crystal cell uniform.

20 Claims, 5 Drawing Sheets

(56) References Cited

U.S. PATENT DOCUMENTS

| | | | | |
|---|---|---|---|---|
| 2008/0252817 A1* | 10/2008 | Chang | ............... | G02B 6/0051 |
| | | | | 349/64 |
| 2016/0018672 A1* | 1/2016 | Wang | ............... | B29D 11/00028 |
| | | | | 359/464 |
| 2020/0064675 A1* | 2/2020 | Yoshiga | ............ | G02F 1/133615 |

FOREIGN PATENT DOCUMENTS

| | | |
|---|---|---|
| CN | 202896252 U | 4/2013 |
| CN | 106019674 A | 10/2016 |
| CN | 106292030 A | 1/2017 |
| CN | 107229157 A | 10/2017 |
| CN | 210166052 U | 3/2020 |
| CN | 112859419 A | 5/2021 |
| CN | 113075816 A | 7/2021 |
| CN | 113514971 A | 10/2021 |
| CN | 113667495 A | 11/2021 |

OTHER PUBLICATIONS

PCT Written Opinion of the International Search Authority for International Application No. PCT/CN2021/138487, dated Jul. 29, 2022, 9pp.
Chinese Office Action issued in corresponding Chinese Patent Application No. 202111511913.6 dated Jan. 5, 2023, pp. 1-10, 17pp.

\* cited by examiner

DISPLAY PANEL AND PREPARATION METHOD THEREOF, AND DISPLAY DEVICE

CROSS REFERENCE TO RELATED APPLICATIONS

This application is a National Phase of PCT Patent Application No. PCT/CN2021/138487 having International filing date of Dec. 15, 2021, which claims the benefit of priority of Chinese Application No. 202111511913.6 filed on Dec. 7, 2021. The contents of the above applications are all incorporated by reference as if fully set forth herein in their entirety.

TECHNICAL FIELD

The present application relates to a field of display, and in particular, to a display panel and a preparation method thereof, and a display device.

BACKGROUND

A polymer liquid crystal cell, that is, a polymer dispersed liquid crystal (PDLC) provided between two substrates. Polymer liquid crystal cell has been widely used in life, for example, a polymer liquid crystal cell can be used as a light guide plate in a display panel of a liquid crystal display device, or a polymer liquid crystal cell can be used as a transparent display panel.

However, when a polymer liquid crystal cell is used in a display panel, light emitting intensities close to a light source area are large, and light emitting intensities away from a light source area are small, which results in problems of uneven light guiding and light emitting.

Technical Problem

Embodiments of the present application provide a display panel and a preparation method thereof, and a display device, which can solve the problem that when a polymer liquid crystal cell is used in a display panel, light emitting intensities close to a light source area are large, and light emitting intensities away from a light source area are small, which results in problems of uneven light guiding and light emitting.

Technical Solution

An embodiment of the present application provides a display panel, comprising:
- a polymer liquid crystal cell comprising a polymer dispersed liquid crystal; and
- a light source disposed outside of at least one side end of the polymer liquid crystal cell;
- wherein the polymer liquid crystal cell comprises a first region close to the light source and a second region away from the light source, and the second region has a higher haze than the first region.

Optionally, in some embodiments of the present application, wherein a haze gradually increases from the first region to the second region.

Optionally, in some embodiments of the present application, wherein the polymer liquid crystal cell comprises a first side end and a second side end, the first side end and the second side end are disposed opposite to each other, the light source is disposed outside the first side end, and the second region corresponds to the second side end.

Optionally, in some embodiments of the present application, wherein the polymer liquid crystal cell comprises a first side end and a second side end, the first side end and the second side end are disposed opposite to each other, the light source is disposed outside the first side end and outside the second side end, and the second region corresponds to an intermediate portion between the first side end and the second side end.

Optionally, in some embodiments of the present application, wherein a haze of the polymer dispersed liquid crystal in the first region of the polymer liquid crystal cell ranges from 20% to 60%, and a haze of the polymer dispersed liquid crystal in the second region of the polymer liquid crystal cell ranges from 80% to 95%.

Optionally, in some embodiments of the present application, wherein the polymer liquid crystal cell comprises a first substrate, a second substrate, a first electrode layer disposed on the first substrate, and a second electrode layer disposed on the second substrate, the first electrode layer and the second electrode layer are disposed opposite to each other in the polymer liquid crystal cell, and the polymer dispersed liquid crystal is sandwiched between the first electrode layer and the second electrode layer.

Optionally, in some embodiments of the present application, wherein the display panel is a transparent display panel, and the light source comprises at least a plurality of red sub-light sources, a plurality of green sub-light sources, and a plurality of blue sub-light sources; and
- the polymer liquid crystal cell comprises a plurality of sub-pixels, each sub-pixel comprises a plurality of pixel electrodes located on the first electrode layer or the second electrode layer.

Accordingly, an embodiment of the present application further provides a display device, comprising a display liquid crystal cell and a display panel, wherein the display panel comprises:
- a polymer liquid crystal cell comprising a polymer dispersed liquid crystal;
- a light source disposed outside of at least one side end of the polymer liquid crystal cell;
- wherein the polymer liquid crystal cell comprises a first region close to the light source and a second region away from the light source, and the second region has a higher haze than the first region; and
- wherein the display liquid crystal cell is located on one side of the polymer liquid crystal cell.

Optionally, in some embodiments of the present application, wherein a haze gradually increases from the first region to the second region.

Optionally, in some embodiments of the present application, wherein the polymer liquid crystal cell comprises a first side end and a second side end, the first side end and the second side end are disposed opposite to each other, the light source is disposed outside the first side end, and the second region corresponds to the second side end.

Optionally, in some embodiments of the present application, wherein the polymer liquid crystal cell comprises a first side end and a second side end, the first side end and the second side end are disposed opposite to each other, the light source is disposed outside the first side end and outside the second side end, and the second region corresponds to an intermediate portion between the first side end and the second side end.

Optionally, in some embodiments of the present application, wherein a haze of the polymer dispersed liquid crystal in the first region of the polymer liquid crystal cell ranges from 20% to 60%, and a haze of the polymer dispersed liquid crystal in the second region of the polymer liquid crystal cell ranges from 80% to 95%.

Accordingly, an embodiment of the present application further provides a method of preparing a display panel, wherein the method comprises:

step S100: providing a patterned mask plate, wherein a first portion of the mask plate has a smaller ultraviolet light transmittance than a second portion of the mask plate;

step S200: providing a polymer liquid crystal cell comprising a polymer dispersed liquid crystal;

step S300: aligning the mask plate with the polymer liquid crystal cell, wherein the first portion of the mask plate corresponds to a first region of the polymer liquid crystal cell, and the second portion of the mask plate corresponds to a second region of the polymer liquid crystal cell;

step S400: irradiating the polymer liquid crystal cell with an ultraviolet light through the mask plate, wherein the polymer dispersed liquid crystal in the polymer liquid crystal cell is subjected to reactions of separating of liquid crystal from a polymer phase and curing, so that the second region has a higher haze than the first region; and step S500: providing a light source, and disposing the light source outside a first side end of the polymer liquid crystal cell, and the first side end corresponds to the first region.

Optionally, in some embodiments of the present application, wherein in the step S100, an ultraviolet light transmittance gradually increases from the first portion to the second portion; and in the step S400, a haze gradually increases from the first region to the second region.

Optionally, in some embodiments of the present application, wherein in the step S500, the polymer liquid crystal cell comprises a second side end disposed opposite to the first side end portion, and the second region is located at the second side end.

Optionally, in some embodiments of the present application, wherein in the step S500, the polymer liquid crystal cell comprises a first side end and a second side end, the first side end and the second side end are disposed opposite to each other, the light source is disposed outside the first side end and outside the second side end, and the second region corresponds to an intermediate portion between the first side end and the second side end.

Optionally, in some embodiments of the present application, wherein the mask plate is prepared by a following method:

step S1110: providing a transparent substrate;

step S1120: forming a film medication on the transparent substrate;

step S1130: exposing the film medication with an exposure illuminance gradually decreasing from the first portion to the second portion; and step S1140: developing the film medication, so that an ultraviolet light transmittance of the film medication decreases gradually from the second portion to the first portion.

Optionally, in some embodiments of the present application, wherein the mask plate is prepared by a following method:

step S1210: providing a substrate;

step S1220: forming a metal layer on the substrate; and step S1230: patterning the metal layer by a nanoimprinting method to form a metal wire grid polarizer, direction of metal wire grid of the metal wire grid polarizer gradually changes from a first direction of the first portion to a second direction of the second portion, the first portion corresponds to the first region, the second portion corresponds to the second region, and the first direction intersects the second direction.

Optionally, in some embodiments of the present application, wherein when the metal wire grid polarizer is irradiated with a polarized ultraviolet light, transmittance of the metal wire grid polarizer gradually increases from the first portion to the second portion.

Optionally, in some embodiments of the present application, wherein the mask plate comprises a small hole or a slit, and the small hole or the slit is provided corresponding to the second portion.

Technical Effects

Embodiments of the present application provide a display panel and a preparation method thereof, and a display device. By using a patterned mask plate, an ultraviolet light with different intensities reaches polymer dispersed liquid crystals at different positions, thereby affecting a separation rate of the liquid crystal and the polymer phase. The greater the ultraviolet light intensity, the more the amount of radicals generated at the instant when irradiation begins, and the liquid crystal and the polymer are cured without enough time for phase separation, so that the polymer hole has a reduced diameter. The smaller the size of liquid crystal droplets, the larger the size of the liquid crystal droplets close to the first region of the light source, and the smaller the size of the liquid crystal droplets away from the second region of the light source, so that the second region has a higher haze than the first region, thereby reducing the light emitting intensity close to the light source region and increasing the light emitting intensity away from the light source region, so that light guide and light emitting in each region of the polymer liquid crystal cell uniform.

BRIEF DESCRIPTION OF THE DRAWINGS

In order to more clearly describe the technical solutions in the embodiments of the present application, hereinafter, the appended drawings used for describing the embodiments will be briefly introduced. Apparently, the appended drawings described below are only directed to some embodiments of the present application, and for a person skilled in the art, without expenditure of creative labor, other drawings can be derived on the basis of these appended drawings.

DETAILED DESCRIPTION

Figure 1:
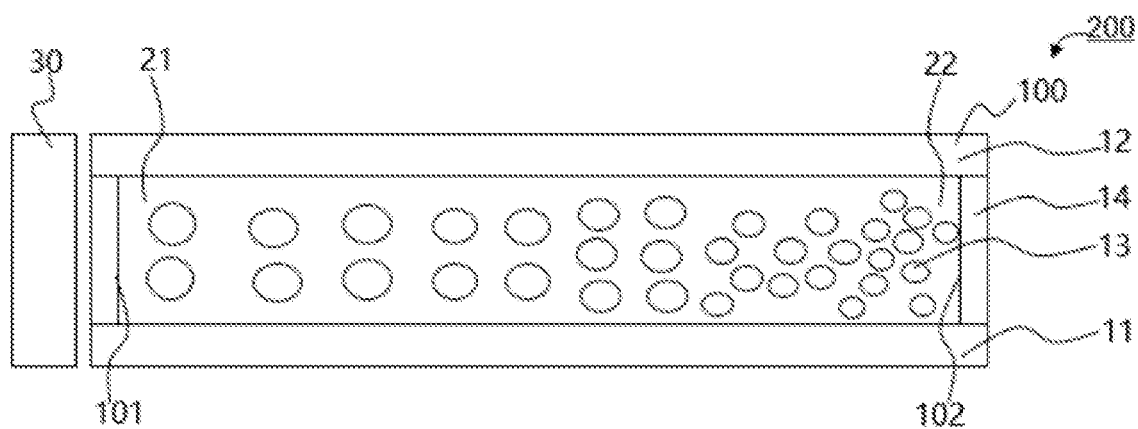
FIG. 1 is a first schematic structural diagram of a display panel according to an embodiment of the present application.

Hereinafter, technical solution in embodiments of the present application will be clearly and completely described with reference to the accompanying drawings in embodiments of the present application. Apparently, the described embodiments are part of, but not all of, the embodiments of the present application. All the other embodiments, obtained by a person with ordinary skill in the art on the basis of the embodiments in the present application without expenditure of creative labor, belong to the protection scope of the present application. In addition, it should be understood that the specific embodiments described herein are intended only to illustrate and explain the present application, and are not intended to limit the present application. In the present application, unless otherwise stated, the directional words such as "up" and "down" used usually refer to the up and down of the device in actual use or working state, specifically the drawing direction in the drawings; while "inside" and "outside" are in terms of the outline of the device.

An embodiment of the present application provides a display panel, comprising a polymer liquid crystal cell comprising a polymer dispersed liquid crystal; and a light source disposed outside of at least one side end of the polymer liquid crystal cell; wherein the polymer liquid crystal cell comprises a first region close to the light source and a second region away from the light source, and the second region has a higher haze than the first region.

An embodiment of the present application provides a display panel, a preparation method thereof, and a display device. Details are given below. It should be noted that the order of description of the following embodiments is not a limitation on the preferred order of the embodiments Embodiment 1

Referring to FIG. 1, FIG. 1 is a first schematic structural diagram of a display panel 200 according to an embodiment of the present application.

An embodiment of the present application provides a display panel 200, which comprises a polymer liquid crystal cell 100 and a light source 30, the polymer liquid crystal cell 100 comprises a polymer dispersed liquid crystal 13, and the light source is disposed outside of at least one side end of the polymer liquid crystal cell 100. The polymer liquid crystal cell 100 comprises a first region 21 close to the light source 30 and a second region 22 away from the light source 30. The second region 22 has a higher haze than the first region 21.

Specifically, the display panel 200 comprises a polymer liquid crystal cell 100 and a light source 30. The polymer liquid crystal cell 100 functions as a light guide plate of the display panel 200, and plays a role of guiding and discharge light from the light source 30 to emit from a surface of a first substrate 11 or a second substrate 12. Specifically, the polymer liquid crystal cell 100 may also function as a light guide plate of the display panel 200, and the polymer liquid crystal cell 100 may also function as a light diffusion layer, that is, the polymer liquid crystal cell 100 may function as a light guide plate and a light diffusion layer.

Specifically, the display panel 200 comprises a polymer liquid crystal cell 100 and a light source 30. The polymer liquid crystal cell 100 may also be used for dimming control or as a pixel switch of the display panel 200, and meanwhile plays a role of guiding and discharge light from the light source 30 to emit from a surface of a first substrate 11 or a second substrate 12. For example, in a transparent display, the light source may comprise a red sub-light source, a green sub-light source and a blue sub-light source. A pixel electrode corresponding to each sub-pixel is provided on one side of the substrate of the polymer liquid crystal cell 100. By controlling voltage applied on the pixel electrode, the sub-pixel can be controlled to switch between a transparent state and a scattering state, in combination with a field sequential color driving mode of the red sub-light source, the green sub-light source and the blue sub-light source, the polymer liquid crystal cell 100 is allowed to display different colors, which is described in detail in the subsequent embodiments.

Specifically, the light source 30 is disposed outside of at least one side end of the polymer liquid crystal cell 100, the light source is disposed outside the first side end 101 of the polymer liquid crystal cell 100, or the light source is disposed outside the second side end 102 of the polymer liquid crystal cell 100. FIG. 1 shows that the light source 30 is disposed outside the first side end 101 of the polymer liquid crystal cell 100.

Specifically, the polymer liquid crystal cell 100 comprises a first region 21 close to the light source 30 and a second region 22 away from the light source 30. The second region 22 has a higher haze than the first region 21, that is, droplet size of the polymer dispersed liquid crystal 13 in the second region 22 is smaller than droplet size of the polymer dispersed liquid crystal 13 in the first region 21, and droplet number of the polymer dispersed liquid crystal 13 in the second region 22 is larger than droplet number of the polymer dispersed liquid crystal 13 in the first region 21.

Specifically, when light from the light source 30 passes through the droplets of the polymer dispersed liquid crystal, it is strongly scattered, the smaller the droplet size of the polymer-dispersed liquid crystal 13, the more the number of droplets, the higher the haze, the stronger the scattering at the liquid crystal-polymer interface, and the stronger the light emitted from the polymer liquid crystal cell 100.

Specifically, in the polymer liquid crystal cell 100, since the light intensity of the light source close to the first region 21 of the light source 30 is strong, so it is necessary to reduce the haze and scattering, thereby reducing the intensity of the light emitted from the polymer liquid crystal cell 100 at this position. In the polymer liquid crystal cell 100, the light is weak in the second region 22 away from the light source 30, so it is necessary to increase the haze and enhance the scattering, thereby increasing the intensity of the light emitted from the polymer liquid crystal cell 100 at this position.

Specifically, the second region 22 has a higher haze than the first region 21, so that light emitted from each portion of the polymer liquid crystal cell 100 is uniform.

In some embodiments, a haze gradually increases from the first region 21 to the second region 22.

Specifically, a haze gradually increases from the first region 21 to the second region 22, that is, the droplet size of the polymer dispersed liquid crystal 13 gradually decreases from the first region 21 to the second region 22, and the scattering effect gradually increases from the first region 21 to the second region 22, so that the intensity of light emitted from each portion of the first region 21 to the second region 22 is consistent, and the uniformity of light emitted from each portion of the display panel 200 is improved.

In some embodiments, the polymer liquid crystal cell 100 comprises a first side end 101 and a second side end 102, the first side end 101 and the second side end 102 are disposed opposite to each other, the light source 30 is disposed outside the first side end 101, and the second region 22 corresponds to the second side end 102.

Specifically, in some embodiments, the light source 30 is provided outside the first side end 101, the light source 30 is not provided outside the second side end 102 provided opposite to the first side end 101, the second region 22 corresponds to the second side end 102, or the second region 22 is located close to the second side end 102, the second region 22 has a higher haze than the first region 21, or a haze gradually increases from the first region 21 to the second region 22, so that light emitted from each portion of the polymer liquid crystal cell 100 is uniform.

In some embodiments, a haze of the polymer dispersed liquid crystal 3 in the first region 21 of the polymer liquid crystal cell 100 ranges from 20% to 60%, and a haze of the polymer dispersed liquid crystal 12 in the second region 22 of the polymer liquid crystal cell 100 ranges from 80% to 95%.

Specifically, the haze of the polymer dispersed liquid crystal 13 in the first region 21 is low and can be set within a range of 20%-60%, and the haze of the polymer dispersed liquid crystal in the second region 22 is high and can be set in a range of 80%-95%. The second region 22 has a higher haze than the first region 21, or a haze gradually increases from the first region 21 to the second region 22, so that light emitted from each portion of the polymer liquid crystal cell 100 is uniform.

In an embodiment of the present application, the droplet size of the liquid crystal in the first region 21 close to the light source 30 is increased, the droplet size of the liquid crystal in the second region 22 away from the light source 30 is decreased, so that the second region 22 has a higher haze than the first region 21, thereby reducing the light emitting intensity close to the light source 30, and increasing the light emitting intensity away from the light source 100, so that light guide and light emitting in each region of the polymer liquid crystal cell 100 uniform.

It should be noted that the polymer liquid crystal cell 100 can be sealed between the first substrate 11 and the second substrate 12 through a sealing material such as a frame glue 14.

Embodiment 2

This embodiment is the same as or similar to the above-described embodiment except that the light source 30 is disposed outside the first side end 101 and outside the second side end 102, and the second region 22 corresponds to an intermediate portion between the first side end 101 and the second side end 102.

Figure 2:
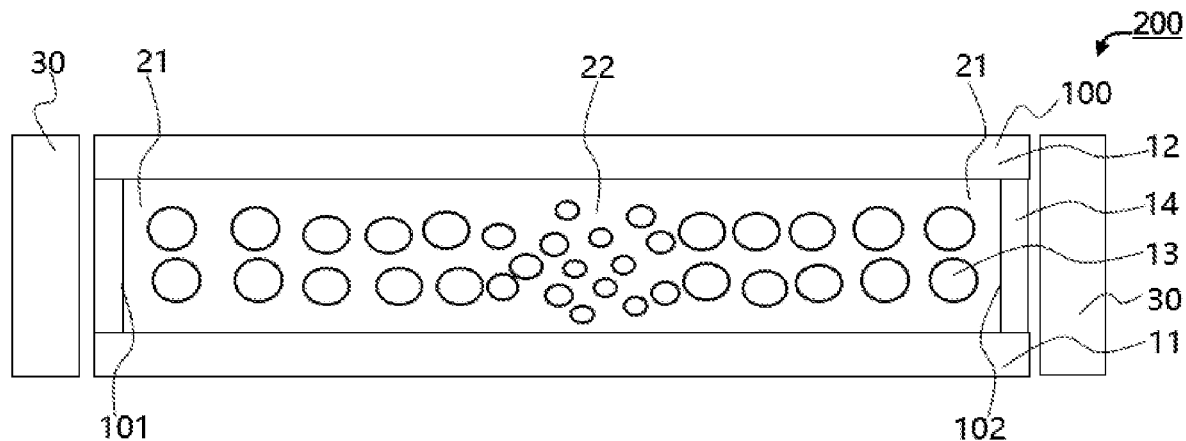
FIG. 2 is a second schematic structural diagram of a display panel according to an embodiment of the present application.

Referring to FIG. 2, FIG. 2 is a second schematic structural diagram of a display panel 200 according to an embodiment of the present application.

In an embodiment of the present application, the polymer liquid crystal cell 100 comprises a first side end 101 and a second side end 102, the first side end 101 and the second side end 102 are disposed opposite to each other, the light source 30 is disposed outside the first side end 101 and outside the second side end 102, and the second region 22 corresponds to an intermediate portion between the first side end 101 and the second side end 102.

Specifically, in some embodiments, the polymer liquid crystal cell 100 comprises a first side end 101 and a second side end 102, the first side end 101 and the second side end 102 are disposed opposite to each other, and the light source 30 is simultaneously disposed both outside the first side end 101 and outside of the second side end 102, so as to improve the brightness of the display panel 200.

Specifically, the light source 30 is simultaneously provided both outside the first side end 101 and outside the second side end 102, the second region 22 is provided away from the light source 30, and the second region 22 corresponds to an intermediate portion between the first side end 101 and the second side end 102.

Specifically, the second region 22 corresponds to or is located in the middle of the polymer liquid crystal cell 100, i.e., the middle of the first side end 101 and the second side end 102.

In an embodiment of the present application, the light source 30 is provided simultaneously outside the first side end 101 and outside the second side end 102, and the second region 22 corresponds to an intermediate portion between the first side end 101 and the second side end 102. The droplet size of the liquid crystal in the first region 21 close to the light source is increased, and the droplet size of the liquid crystal in the second region 22 away from the light source 30 is decreased, so that the second region 22 has a higher haze than the first region 21, thereby reducing the light emitting intensity of the region close to the light source increasing the light emitting intensity of the region away from the light source 30, so that light guide and light emitting in each region of the polymer liquid crystal cell uniform.

Embodiment 3

This embodiment is the same as or similar to the above-described embodiment except that the polymer liquid crystal cell 100 further comprises a first electrode layer 15 and a second electrode layer 16.

Figure 3:
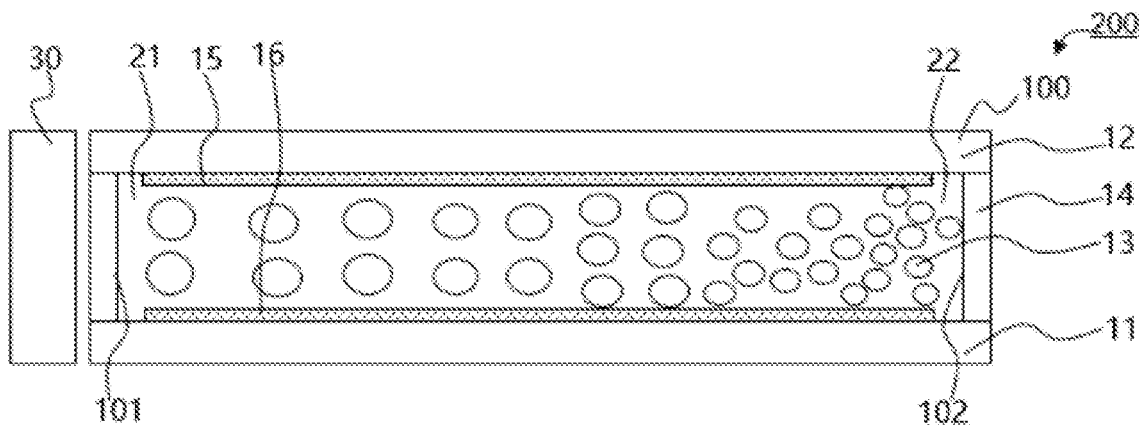
FIG. 3 is a third schematic structural diagram of a display panel according to an embodiment of the present application.
Figure 4:
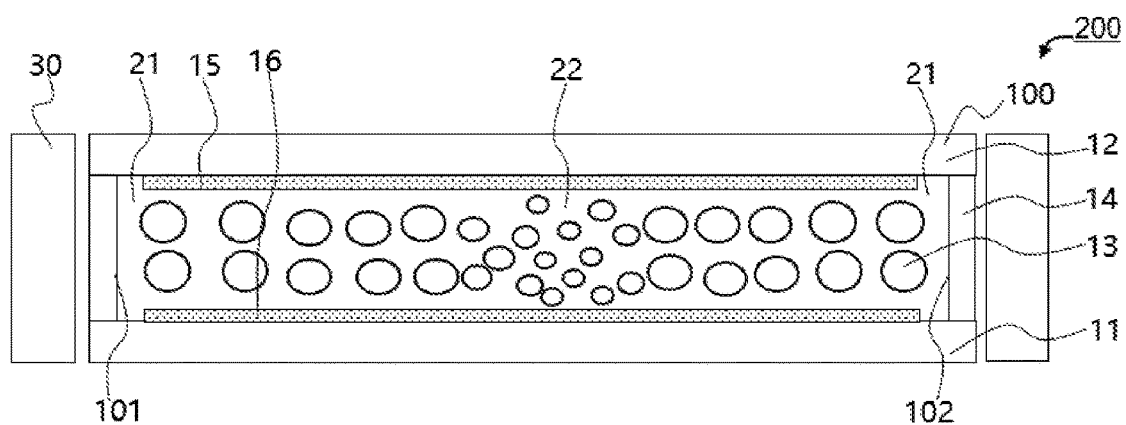
FIG. 4 is a fourth schematic structural diagram of a display panel according to an embodiment of the present application.

Referring to FIGS. 3 and 4, FIG. 3 is a third schematic structural diagram of a display panel 200 according to an embodiment of the present application. FIG. 4 is a fourth schematic structural diagram of a display panel 200 according to an embodiment of the present application.

In some embodiments, the polymer liquid crystal cell 100 comprises a first substrate 11 and a second substrate 12, and a first electrode layer 15 disposed on the first substrate 11 and a second electrode layer 16 disposed on the second substrate 12. The first electrode layer 15 and the second electrode layer 16 are disposed opposite to each other in the polymer liquid crystal cell 100, and the polymer dispersed liquid crystal 13 is sandwiched between the first electrode layer 15 and the second electrode layer 16.

Specifically, the polymer dispersed liquid crystal, also referred to as PDLC, is a homogeneous solution formed by mixing a small molecular liquid crystal polymer and a prepolymer. Since optical axis of a micro droplet composed of liquid crystal molecules is in a free orientation, its refractive index does not match that of the matrix, and when light passes through the matrix, it is strongly scattered by the droplets, and it becomes opaque milky white or translucent. An optical axis orientation of the liquid crystal droplets can be adjusted by applying an electric field. When the refractive indexes of the droplets match, the droplets are transparent. When the electric field is removed, the liquid crystal droplets return to their original astigmatic state, thus displaying.

Specifically, in some embodiments, the polymer dispersed liquid crystal 13 is sandwiched between the first electrode layer 15 and the second electrode layer 16, and the polymer liquid crystal cell may assume a transparent state when a voltage is applied to the first electrode layer 15 and the second electrode layer 16.

Specifically, the polymer liquid crystal cell 100 may serve as a light guide plate of a transparent display panel, and may switch between a transparent state and a scattering state.

Specifically, the display panel 200 comprises a polymer liquid crystal cell 100 and a light source 30. The polymer liquid crystal cell 100 functions as a light guide plate of the display panel 200, and the polymer liquid crystal cell 100 may also function as a light diffusion layer, that is, the polymer liquid crystal cell 100 may function as a light guide plate and a light diffusion layer.

Specifically, when no voltage is applied to the first electrode layer 15 and the second electrode layer 16, the polymer liquid crystal cell 100 is in a fog state or a scattering state, and functions as a light guide plate to homogenize light from the side incident light source thereby forming surface emitting.

Specifically, when a voltage is applied to the first electrode layer and the second electrode layer, the polymer liquid crystal cell 100 is in a transparent state, and ambient light can be transmitted through the polymer liquid crystal cell 100. In this case, the polymer liquid crystal cell 100 and the display panel 200 can be applied to a transparent display device and a display device provided with an optical sensor under the screen.

In an embodiment of the present application, by providing a polymer dispersed liquid crystal sandwiched between the first electrode layer and the second electrode layer, the transparent state and the scattering state of the polymer liquid crystal cell can be switched, thereby increasing the application range of the display panel 200.

Embodiment 4

This embodiment is the same as or similar to the above-described embodiment except that the display panel 200 in this embodiment is a transparent display panel, and the structure and working principle of the transparent display panel are described in detail.

Figure 5:
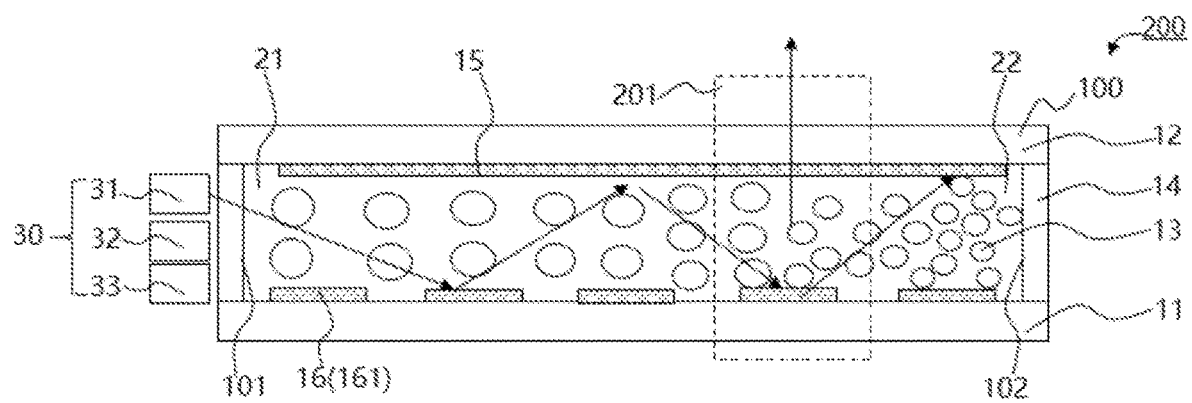
FIG. 5 is a fifth schematic structural diagram of a display panel according to an embodiment of the present application.
Figure 6:
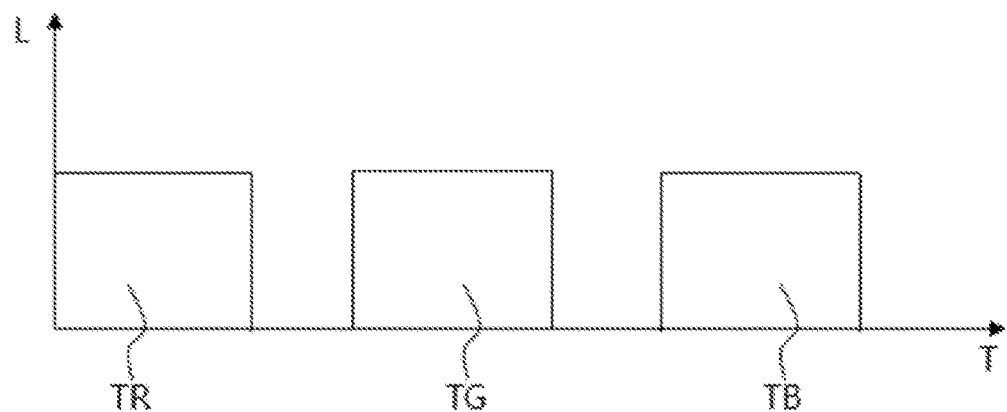
FIG. 6 is a timing diagram of a plurality of sub-light sources in a display panel according to an embodiment of the present application.

Referring to FIGS. 5 and 6, FIG. 5 is a fifth schematic structural diagram of a display panel 200 according to an embodiment of the present application. FIG. 6 is a timing diagram of a plurality of sub-light sources in a display panel 200 according to an embodiment of the present application.

In some embodiments, the display panel 200 is a transparent display panel, and the light source 30 comprises at least a plurality of red sub-light sources 31, a plurality of green sub-light sources 32, and a plurality of blue sub-light sources 33. The polymer liquid crystal cell 100 comprises a plurality of sub-pixels 201, each sub-pixel 201 comprises a plurality of pixel electrodes 161 located on the first electrode layer 15 or the second electrode layer 16.

Specifically, as shown in FIG. 5, it is exemplified that the second electrode layer 16 comprises a plurality of pixel electrodes 161. In other embodiments, it may be the case that the first electrode layer 15 comprises a plurality of pixel electrodes, which is not limited herein.

Specifically, a substrate provided with a plurality of pixel electrodes may be an array substrate, the array substrate may comprise a plurality of thin film transistors (TFTs) and a plurality of pixel electrodes, and FIG. 5 illustrates that the first substrate 11 is an array substrate.

Specifically, the light source 30 may be an LED lamp (light emitting diode lamp), the red sub-light source 31 may be a red LED lamp (red light emitting diode lamp), the green sub-light source 32 may be a green LED lamp (green light emitting diode lamp), and the blue sub-light source 33 may be a blue LED lamp (blue light emitting diode lamp).

Specifically, in FIG. 6, the abscissa represents time T, the ordinate represents brightness L of different sub-light sources. It can be seen from the figure that the red sub-light source 31, the green sub-light source 32, and the blue sub-light source 33 work in the red light period TR, the green light period TG, and the blue light period TB, respectively. The red sub-light source 31, the green sub-light source 32, and the blue sub-light source 33 work in the different time periods, that is, the transparent display panel in this embodiment is displayed in the field sequential color display mode, which is not described herein again.

Specifically, as shown in FIG. 5, the target sub-pixel displays red as an example. When the red sub-light source 31 emits light in a certain timing, the red light propagates in the polymer liquid crystal cell 100, the pixel electrode 161 of the target sub-pixel is not applied with a voltage, the target sub-pixel scatters red light, and the red light emits from a portion of the second substrate 12 corresponding to the target sub-pixel and displays red. When the target sub-pixel is in a green timing, the target sub-pixel is applied with an AC voltage in the transparent state and does not scatter green light. When the target sub-pixel is in a blue timing, the target sub-pixel is applied with an AC voltage in the transparent state and does not scatter blue light. In conclusion, a single target sub-pixel displaying red is obtained by using the visual residual effect of the human eyes. Similarly, when no voltage is applied to each sub-pixel electrode in the red, green and blue timing, the pixels scatter three colors of red, green and blue light in a specific timing, and a white target sub-pixel is obtained by using the visual residual effect of human eyes.

The above description is for the purpose of more clearly explaining a working mode when the display panel 200 is a transparent display panel. However, based on the spirit of the present invention, the working mode and the working type of the transparent display panel are not limited.

In this embodiment, the display panel 200 comprises a polymer liquid crystal cell 100 and a light source 30. The polymer liquid crystal cell 100 may also be used for dimming control or as a pixel switch of the display panel 200, and meanwhile plays a role of guiding and discharge light from the light source 30 to emit from a surface of a first substrate 11 or a second substrate 12.

In this embodiment, the display panel 200 is a transparent display, the polymer liquid crystal cell 100 may also be used for dimming control or as a pixel switch of the display panel 200, and meanwhile plays a role of guiding and discharge light from the light source 30 to emit from a surface of a first substrate 11 or a second substrate 12. The light source may comprise a red sub-light source, a green sub-light source and a blue sub-light source. A pixel electrode corresponding to each sub-pixel is provided on one side of the substrate of the polymer liquid crystal cell 100. By controlling voltage applied on the pixel electrode, the sub-pixel can be controlled to switch between a transparent state and a scattering state, in combination with a field sequential color driving mode of the red sub-light source, the green sub-light source and the blue sub-light source, the polymer liquid crystal cell 100 is allowed to display different colors.

In this embodiment, light emitted from each portion of the polymer liquid crystal cell 100 is uniform, so that the brightness of the transparent display panel is uniform at each portion, thereby improving the performance of the transparent display panel.

Embodiment 5

An embodiment of the present application further provides a display device 400 comprising a display liquid crystal cell 300 and a display panel 200 as described above, the display liquid crystal cell 300 is located on one side of the polymer liquid crystal cell 100.

Figure 7:
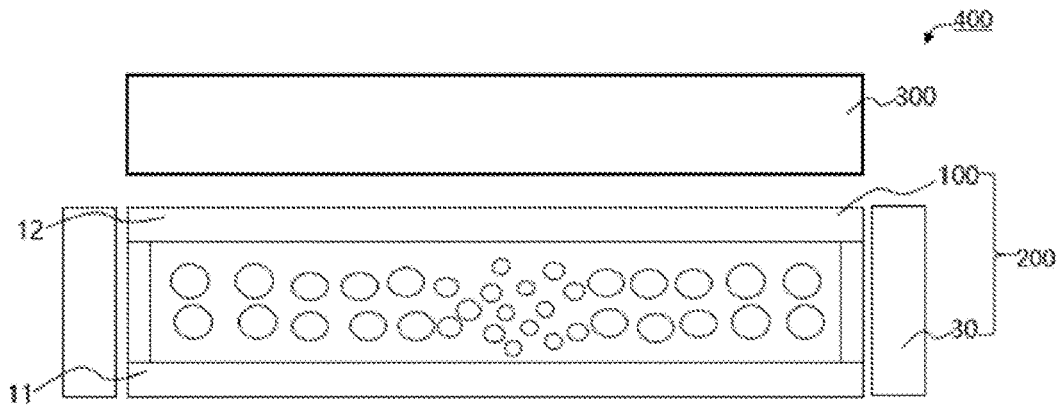
FIG. 7 is a schematic diagram of a display device according to an embodiment of the present application.
Figure 8:
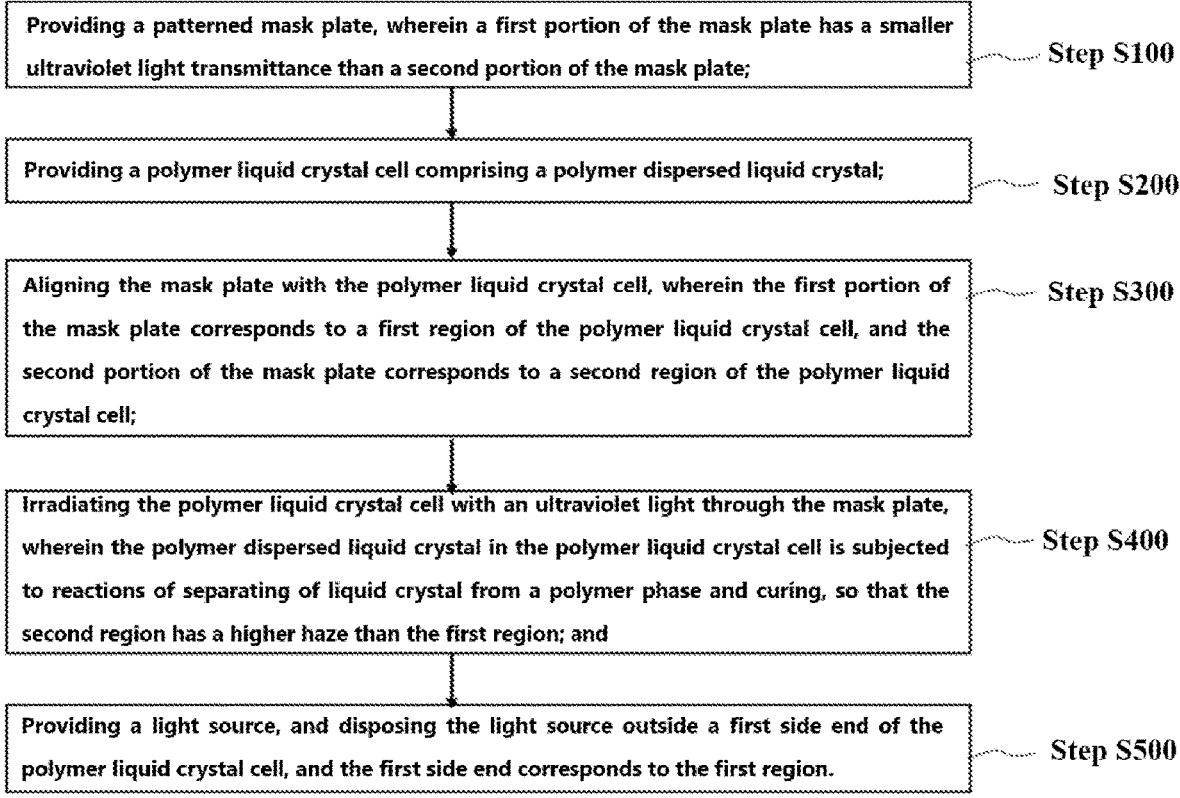
FIG. 8 is a schematic diagram of a flow for preparing a display panel according to an embodiment of the present application.

Referring to FIG. 7, FIG. 7 is a schematic diagram of a display device 400 according to an embodiment of the present application.

Specifically, the display device 400 comprises a display liquid crystal cell 300 and a display panel 200, and the display panel 200 is the display panel of any one of the above embodiments.

Specifically, the display liquid crystal cell 300 is located on one side of the polymer liquid crystal cell 100, and it is shown in FIG. 7 that the display liquid crystal cell 300 is located on one side of the second substrate 12, which is not limited here.

Specifically, the polymer liquid crystal cell 100 homogenizes light from the side incident light source 30, thereby forming surface emitting. Light is emitted from surface of the second substrate 12 to the display liquid crystal cell 300, and the display liquid crystal cell 300 can selectively transmit the incoming light, thereby realizing display of an image.

Specifically, the display liquid crystal cell 300 may be a twisted nematic panel (TN panel), a fringe field switching panel (FFS panel), and a vertical alignment panel (VA panel), and the type of the display liquid crystal cell 300 is not limited here.

Specifically, in this embodiment, the display panel 200 comprises a polymer liquid crystal cell 100 and a light source 30. The polymer liquid crystal cell 100 functions as a light guide plate of the display panel 200, and plays a role of guiding and discharge light from the light source 30 to emit from a surface of a first substrate 11 or a second substrate 12. Specifically, the polymer liquid crystal cell 100 may also function as a light guide plate of the display panel 200, and the polymer liquid crystal cell 100 may also function as a light diffusion layer, that is, the polymer liquid crystal cell 100 may function as a light guide plate and a light diffusion layer.

In an embodiment of the present application, a display device 400 is provided, and the display panel 200 may provide uniform backlight for the display device 400, thereby improving brightness uniformity of the display image of the display device 400.

Embodiment 6

Figure 9:
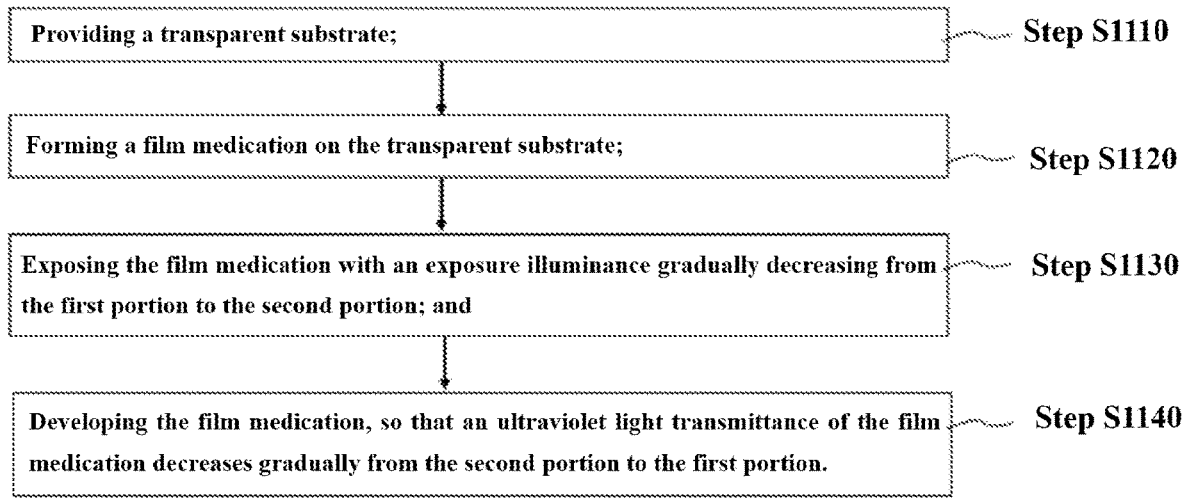
FIG. 9 is a schematic diagram of a flow for preparing a first mask plate according to an embodiment of the present application.
Figure 10:
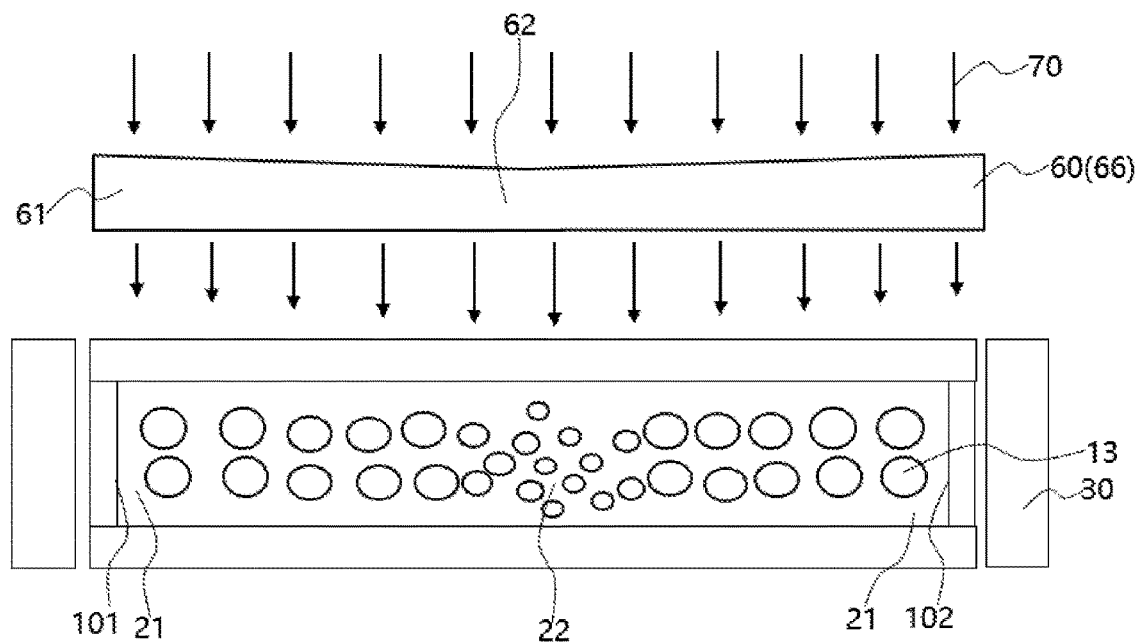
FIG. 10 is a schematic diagram of preparing a display panel by using a first mask plate according to an embodiment of the present application.
Figure 11:
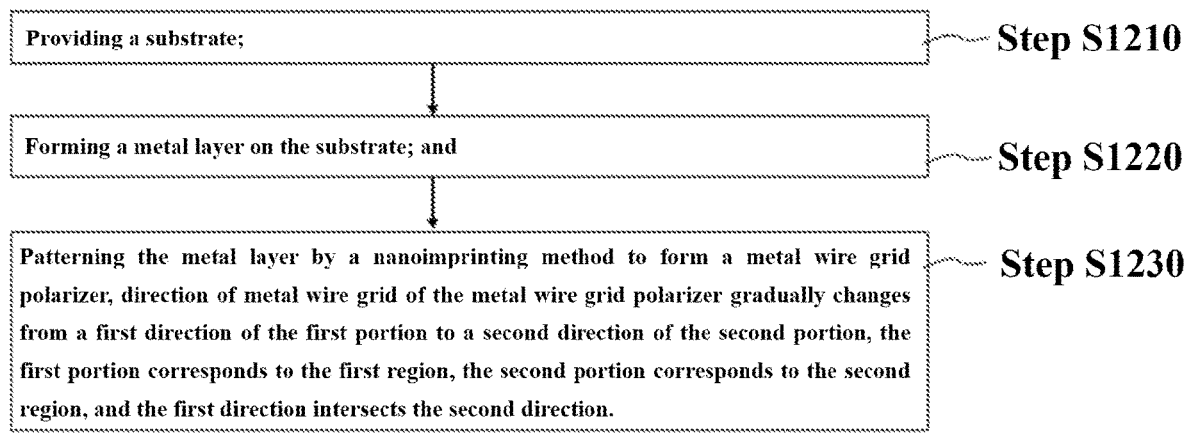
FIG. 11 is a schematic diagram of a flow for preparing a second mask plate according to an embodiment of the present application.
Figure 12:
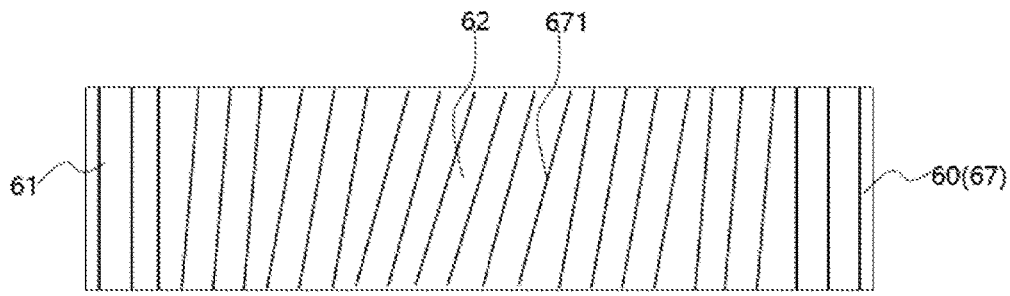
FIG. 12 is a schematic top view of a second mask plate according to an embodiment of the present application.
Figure 13:
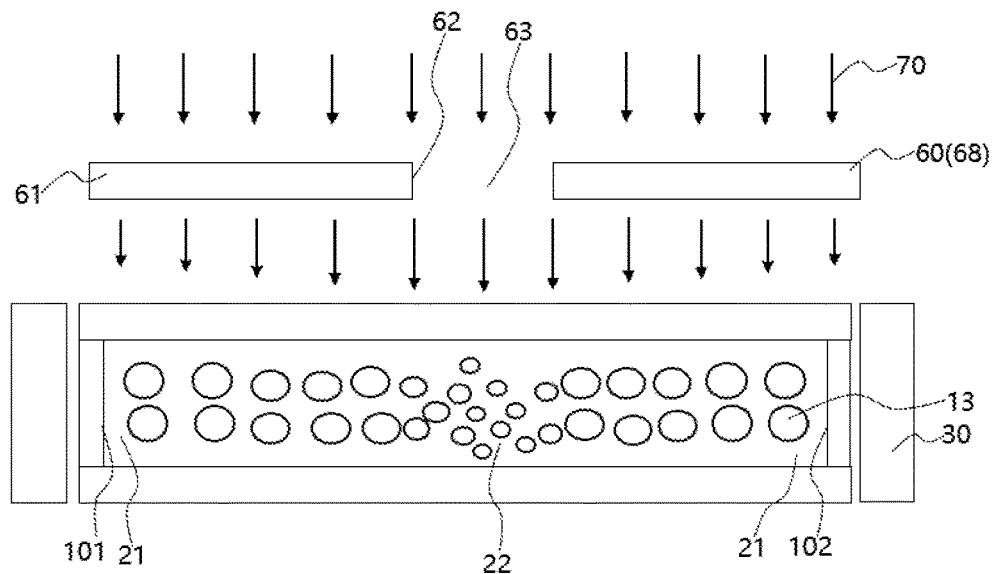
FIG. 13 is a schematic diagram of preparing a display panel by using a third mask plate according to an embodiment of the present application.

Referring to FIGS. 8, 9, 10, 11, 12 and 13, FIG. 8 is a schematic diagram of a flow for preparing a display panel according to an embodiment of the present application. FIG. 9 is a schematic diagram of a flow for preparing a first mask plate according to an embodiment of the present application. FIG. 10 is a schematic diagram of preparing a display panel by using a first mask plate according to an embodiment of the present application. FIG. 11 is schematic diagram of a flow for preparing a second mask plate according to an embodiment of the present application. FIG. 12 is a schematic top view of a second mask plate according to an embodiment of the present application. FIG. 13 is a schematic diagram of preparing a display panel by using a third mask plate according to an embodiment of the present application.

An embodiment of the present application provides a method of preparing a display panel 200 according to any one of the above embodiments. The method of preparing a display panel 200 comprises the following steps: step 100, step 200, step 300, step 400, and step 500:

Step S100: providing a patterned mask plate, wherein a first portion of the mask plate has a smaller ultraviolet light transmittance than a second portion of the mask plate.

Specifically, a patterned mask plate 60 is provided, and a first portion 61 of the mask plate has a smaller ultraviolet light transmittance than a second portion 62 of the mask plate.

Step S200: providing a polymer liquid crystal cell comprising a polymer dispersed liquid crystal.

Specifically, a polymer liquid crystal cell 100 is provided, and the polymer liquid crystal cell 100 comprises a polymer dispersed liquid crystal 13.

Step S300: aligning the mask plate with the polymer liquid crystal cell, wherein the first portion of the mask plate corresponds to a first region of the polymer liquid crystal cell, and the second portion of the mask plate corresponds to a second region of the polymer liquid crystal cell.

Specifically, the mask plate 60 is aligned with the polymer liquid crystal cell 100, the first portion 61 of the mask plate 60 corresponds to a first region 21 of the polymer liquid crystal cell 100, and the second portion 62 of the mask plate 60 corresponds to a second region 22 of the polymer liquid crystal cell 100.

Step S400: irradiating the polymer liquid crystal cell with an ultraviolet light through the mask plate, wherein the polymer dispersed liquid crystal in the polymer liquid crystal cell is subjected to reactions of separating of liquid crystal from a polymer phase and curing, so that the second region has a higher haze than the first region.

Specifically, when the ultraviolet light 70 irradiates the polymer dispersed liquid crystal 13, the transmittance of the ultraviolet light 70 in the first portion 61 of the mask plate 60 is smaller than the transmittance of the ultraviolet light 70 in the second portion 62. When the polymer dispersed liquid crystal 13 in the polymer liquid crystal cell 100 is subjected to reactions of separating of liquid crystal from a polymer phase and curing to form liquid crystal droplets, the larger the transmittance of the ultraviolet light 70 of the mask plate 60, the smaller the size of the formed liquid crystal droplets, the higher the haze of the formed portion, and the stronger the scattering effect.

Specifically, if the transmittance of the ultraviolet light 70 in the first portion 61 of the mask plate 60 is smaller than the transmittance of the ultraviolet light 70 in the second portion 62, the intensity of the ultraviolet light irradiated to the first region 21 is smaller than the intensity of the ultraviolet light irradiated to the second region 22, and the haze of the second region 22 is higher than the haze of the first region 21, that is, the droplet size of the polymer dispersed liquid crystal in the second region 22 is smaller than the droplet size of the polymer dispersed liquid crystal 13 in the first region 21.

Therefore, the polymer liquid crystal cell 100 is irradiated with ultraviolet light 70 through the mask plate 60, and the polymer dispersed liquid crystal 13 in the polymer liquid crystal cell 100 is subjected to reactions of separating of liquid crystal from a polymer phase and curing, so that the second region 22 has a higher haze than the first region 21.

Step S500: providing a light source, and disposing the light source outside a first side end of the polymer liquid crystal cell, and the first side end corresponds to the first region.

Specifically, light source 30 is provided, and the light source 30 is disposed outside the first side end 101 of the polymer liquid crystal cell 100, and the first side end 101 corresponds to the first region 21.

In some embodiments, in the step S100, an ultraviolet light transmittance gradually increases from the first portion to the second portion; and in the step S400, a haze gradually increases from the first region to the second region.

Specifically, when the ultraviolet light transmittance gradually increases from the first portion 61 to the second portion 62 of the mask plate 60, the intensity of the ultraviolet light irradiated to the first region 21 gradually increases to the intensity of the ultraviolet light irradiated to the second region 22, the droplet size of the polymer dispersed liquid crystal 13 gradually decreases from the first region 21 to the second region 22 after reactions of separation of the polymer dispersed liquid crystal and the polymer phase and curing, so that the haze gradually increases from the first region 21 to the second region 22.

In some embodiments, in the step S500, the polymer liquid crystal cell comprises a second side end disposed opposite to the first side end portion, and the second region is located at the second side end.

Specifically, referring to the above-described embodiments, in some embodiments, the light source 30 is provided outside the first side end 101, and the light source is not provided outside the second side end 102 provided opposite to the first side end 101, the second region corresponds to the second side end 102, or the second region is located close to the second side end 102, and the second region 22 has a higher haze than the first region 21, or the haze gradually increases from the first region 21 to the second region 22, so that the light emitted from each portion of the polymer liquid crystal cell 100 is uniform.

In some embodiments, in the step S500, the polymer liquid crystal cell 100 comprises a first side end and a second side end, the first side end and the second side end are disposed opposite to each other, the light source is disposed outside the first side end and outside the second side end, and the second region corresponds to an intermediate portion between the first side end and the second side end.

Specifically, referring to the above-described embodiments, the light source 30 is simultaneously disposed outside of the first side end 101 and outside of the second side end 102, the second region 22 is disposed away from the light source 30, and the second region 22 corresponds to an intermediate portion between the first side end 101 and the second side end 102.

Specifically, the second region 22 corresponds to or is located in the middle of the polymer liquid crystal cell 100, i.e., the middle of the first side end 101 and the second side end 102.

In this embodiment, the mask plate 60 is exemplified as a first mask 66, a second mask 67, and a third mask 68.

In some embodiments, as shown in FIG. 9, the first mask plate is prepared by a method comprising the following steps: step S1110, step S1120, step S1130, and step S1140. The first mask plate is prepared by the following method: step S1110: providing a transparent substrate; step S1120: forming a film medication on the transparent substrate; step S1130: exposing the film medication with an exposure illuminance gradually decreasing from the first portion to the second portion; and step S1140: developing the film medication, so that an ultraviolet light transmittance of the film medication decreases gradually from the second portion to the first portion.

Specifically, the first mask plate 66 is a photosensitive film mask plate. Firstly, a vector diagram drawing tool is used to draw a desired gradient effect, and light intensity of the laser at a corresponding position is set according to the gray value distribution of the drawn gradient vector diagram, then the laser head is controlled to expose the photosensitive film, and a transmittance gradient film mask plate can be obtained after developing the photosensitive film.

Specifically, as shown in FIG. 10, the first mask 66 is covered on the polymer liquid crystal cell 100 and irradiates the polymer liquid crystal cell with ultraviolet light to obtain a polymer liquid crystal cell 100 with gradual haze.

Specifically, in the step S1120, a photographic film or a glass film is formed by coating a film medication on a substrate. In the step S1130, the film medication is exposed, and the exposure illuminance gradually decreases from the first portion to the second portion of the film plane. The crystal particles on the film medication change their shapes after photosensitization and combine with other crystals into blocks. The more the exposure amount is, the more the crystals change and combine into blocks. Different luminosity illumination on the film medication will produce different numbers, sizes and shapes of crystals that change the structure to form potential images. In the step S1140 of developing, the ones with a large degree of structure change will remain and become black, and the ones with small degree of structure change will be partially washed away. As a result, the image with more light will be darker and the image with less light will be whiter, thus an ultraviolet light transmittance of the film medication decreases gradually from the second portion to the first portion 61.

In some embodiments, as shown in FIG. 11, the second mask plate 67 is prepared by a method comprising the following steps: step S1210, step S1220, and step S1230. The mask plate is prepared by the following method: step S1210: providing a substrate; step S1220: forming a metal layer on the substrate; step S1230: patterning the metal layer by a nanoimprinting method to form a metal wire grid polarizer, direction of metal wire grid of the metal wire grid polarizer gradually changes from a first direction of the first portion to a second direction of the second portion, the first portion corresponds to the first region, the second portion corresponds to the second region, and the first direction intersects the second direction.

Specifically, the second mask plate 67 is a metal wire grid mask plate, and the direction of the metal wire grid 671 of the metal wire grid polarizer gradually changes from a first direction of the first portion 61 to a second direction of the second portion 62. The first portion 61 corresponds to the first region 21, the second portion 62 corresponds to the second region 22, and the first direction intersects the second direction.

Specifically, a metal wire grid mask plate is prepared by a nanoimprinting method. According to the required transmittance distribution, different directions of metal wire grids 671 are set in different areas by using the polarized light transmission characteristic of the metal wire grid, and polarized ultraviolet light is used to irradiate the polymer liquid crystal cell 100, so that the metal wire grid in different directions has different transmittance to the polarized light, thus a polymer liquid crystal cell 100 with gradual haze is obtained after curing.

Further, when the metal wire grid polarizer is irradiated with polarized ultraviolet light, the transmittance of the metal wire grid polarizer gradually increases from the first portion 61 to the second portion 62.

Specifically, the polarized ultraviolet light is transmitted through the second mask plate 67 to irradiate the polymer liquid crystal cell 100. The light whose polarization direction is perpendicular to the direction of the metal wire grid 671 may be transmitted through the metal wire grid mask plate, and the direction of the metal wire grid 671 of the metal wire grid polarizer gradually changes from the first direction in the first portion 61 to the second direction in the second portion 62. Therefore, the transmittance of the polarized ultraviolet light transmitted through the metal wire grid mask plate may be provided to gradually increase from the first portion 61 to the second portion 62, and the formation process of different haze at different positions of the polymer liquid crystal cell 100 is not described here again.

In some embodiments, the mask plate comprises small holes or slits that correspond to the second location.

Specifically, as shown in FIG. 13, the third mask plate 68 is a small hole or slit mask plate, which is a mask plate of a polymer liquid crystal cell 100 with gradual haze prepared by using the principle of small hole diffraction or slit diffraction. According to the required haze distribution, masks with different widths of small holes or slits 63 are designed. The transmittance at the small hole or slit 63 is extremely high, and the transmittance in other areas is extremely low. In this way, the ultraviolet light passing through the small hole or slit 63 diffracts, so that the ultraviolet light passing through the mask plate has the maximum intensity at the center of the small hole or slit 63, the smaller the ultraviolet intensity is farther away from the center of the small hole or slit 63, and the formation process of the polymer liquid crystal cell 100 with different haze at different portions is not described here again.

Specifically, the small holes or slits of the third mask plate 68 are provided corresponding to the second portion 62, and the second portion 62 corresponds to the second region 22, so that the droplet size of the liquid crystals in the second region 22 is reduced, so that the polymer dispersed liquid crystal 13 in the second region 22 has a higher haze than that that in the first region 21.

Specifically, as shown in FIG. 13, the third mask plate 68 is covered at a distance of 1-10 mm above the polymer liquid crystal cell 100, and the polymer liquid crystal cell is irradiated with ultraviolet light to obtain the polymer liquid crystal cell 100 with gradual haze.

In an embodiment of the present application, a method of preparing a display panel is provided, which can increase the size of liquid crystal droplets in the first region 21 close to the light source 30, and reduce the size of liquid crystal droplets in the second region 22 away from the light source 30, so that the polymer dispersed liquid crystal 13 in the second region 22 has a higher haze than that in the first region 21, thereby reducing the intensity of light emitted from the region close to the light source 30, increasing the intensity of light emitted from the region away from the light source 30, so that light guide and light emitting in each region of the polymer liquid crystal cell 100 uniform.

In embodiments of the present application, a display panel and a preparation method thereof, and a display device are provided. By using a patterned mask plate, an ultraviolet light with different intensities reaches polymer dispersed liquid crystals at different positions, thereby affecting a separation rate of the liquid crystal and the polymer phase. The greater the ultraviolet light intensity, the more the amount of radicals generated at the instant when irradiation begins, and the liquid crystal and the polymer are cured without enough time for phase separation, so that the polymer hole has a reduced diameter. The smaller the size of liquid crystal droplets, the larger the size of the liquid crystal droplets close to the first region of the light source, and the smaller the size of the liquid crystal droplets away from the second region of the light source, so that the second region has a higher haze than the first region, thereby reducing the light emitting intensity close to the light source region and increasing the light emitting intensity away from the light source region, so that light guide and light emitting in each region of the polymer liquid crystal cell uniform.

The above contents describe in detail for the display panel and preparation method thereof, and the display device provided in embodiments of the present application. The principles and embodiments of the present application are described by using specific examples. The description of the embodiments is merely intended to help understand the method and core ideas of the present application. At the same time, according to the ideas of the present application, there will be changes in specific embodiments and application scope for those skilled in the art. In conclusion, the content of the specification shall not be construed as a limitation to the present application.

What is claimed is:

1. A display panel, comprising:
a polymer liquid crystal cell comprising a polymer dispersed liquid crystal; and
a light source disposed outside of at least one side end of the polymer liquid crystal cell;
wherein the polymer liquid crystal cell comprises a first region close to the light source and a second region away from the light source, and the second region has a higher haze than the first region; and
wherein droplet size of the polymer dispersed liquid crystal in the second region is smaller than droplet size of the polymer dispersed liquid crystal in the first region, and droplet number of the polymer dispersed liquid crystal in the second region is larger than droplet number of the polymer dispersed liquid crystal in the first region.

2. The display panel according to claim 1, wherein a haze gradually increases from the first region to the second region.

3. The display panel according to claim 1, wherein the polymer liquid crystal cell comprises a first side end and a second side end, the first side end and the second side end are disposed opposite to each other, the light source is disposed outside the first side end, and the second region corresponds to the second side end.

4. The display panel according to claim 1, wherein the polymer liquid crystal cell comprises a first side end and a second side end, the first side end and the second side end are disposed opposite to each other, the light source is disposed outside the first side end and outside the second side end, and the second region corresponds to an intermediate portion between the first side end and the second side end.

5. The display panel according to claim 1, wherein a haze of the polymer dispersed liquid crystal in the first region of the polymer liquid crystal cell ranges from 20% to 60%, and a haze of the polymer dispersed liquid crystal in the second region of the polymer liquid crystal cell ranges from 80% to 95%.

6. The display panel according to claim 1, wherein the polymer liquid crystal cell comprises a first substrate, a second substrate, a first electrode layer disposed on the first substrate, and a second electrode layer disposed on the second substrate, the first electrode layer and the second electrode layer are disposed opposite to each other in the polymer liquid crystal cell, and the polymer dispersed liquid crystal is sandwiched between the first electrode layer and the second electrode layer.

7. The display panel according to claim 6, wherein the display panel is a transparent display panel, and the light source comprises at least a plurality of red sub-light sources, a plurality of green sub-light sources, and a plurality of blue sub-light sources; and
the polymer liquid crystal cell comprises a plurality of sub-pixels, each sub-pixel comprises a plurality of pixel electrodes located on the first electrode layer or the second electrode layer.

8. A display device, comprising a display liquid crystal cell and a display panel, wherein the display panel comprises:
a polymer liquid crystal cell comprising a polymer dispersed liquid crystal;
a light source disposed outside of at least one side end of the polymer liquid crystal cell;
wherein the polymer liquid crystal cell comprises a first region close to the light source and a second region away from the light source, and the second region has a higher haze than the first region; and
wherein droplet size of the polymer dispersed liquid crystal in the second region is smaller than droplet size of the polymer dispersed liquid crystal in the first region, and droplet number of the polymer dispersed liquid crystal in the second region is larger than droplet number of the polymer dispersed liquid crystal in the first region; and
wherein the display liquid crystal cell is located on one side of the polymer liquid crystal cell.

9. The display device according to claim 8, wherein a haze gradually increases from the first region to the second region.

10. The display device according to claim 8, wherein the polymer liquid crystal cell comprises a first side end and a second side end, the first side end and the second side end are disposed opposite to each other, the light source is disposed outside the first side end, and the second region corresponds to the second side end.

11. The display device according to claim 8, wherein the polymer liquid crystal cell comprises a first side end and a second side end, the first side end and the second side end are disposed opposite to each other, the light source is disposed outside the first side end and outside the second side end, and the second region corresponds to an intermediate portion between the first side end and the second side end.

12. The display device according to claim 8, wherein a haze of the polymer dispersed liquid crystal in the first region of the polymer liquid crystal cell ranges from 20% to 60%, and a haze of the polymer dispersed liquid crystal in the second region of the polymer liquid crystal cell ranges from 80% to 95%.

13. A method of preparing a display panel, wherein the method comprises:
step S100: providing a patterned mask plate, wherein a first portion of the mask plate has a smaller ultraviolet light transmittance than a second portion of the mask plate;
step S200: providing a polymer liquid crystal cell comprising a polymer dispersed liquid crystal;
step S300: aligning the mask plate with the polymer liquid crystal cell, wherein the first portion of the mask plate corresponds to a first region of the polymer liquid crystal cell, and the second portion of the mask plate corresponds to a second region of the polymer liquid crystal cell; allowing droplet size of the polymer dispersed liquid crystal in the second region to be smaller than droplet size of the polymer dispersed liquid crystal in the first region, and allowing droplet number of the polymer dispersed liquid crystal in the second region to be larger than droplet number of the polymer dispersed liquid crystal in the first region;
step S400: irradiating the polymer liquid crystal cell with an ultraviolet light through the mask plate, wherein the polymer dispersed liquid crystal in the polymer liquid crystal cell is subjected to reactions of separating of liquid crystal from a polymer phase and curing, so that the second region has a higher haze than the first region; and
step S500: providing a light source, and disposing the light source outside a first side end of the polymer liquid crystal cell, and the first side end corresponds to the first region.

14. The method according to claim 13, wherein in the step S100, an ultraviolet light transmittance gradually increases from the first portion to the second portion; and in the step S400, a haze gradually increases from the first region to the second region.

15. The method according to claim 14, wherein in the step S500, the polymer liquid crystal cell comprises a second side end disposed opposite to the first side end portion, and the second region is located at the second side end.

16. The method according to claim 14, wherein in the step S500, the polymer liquid crystal cell comprises a first side end and a second side end, the first side end and the second side end are disposed opposite to each other, the light source is disposed outside the first side end and outside the second side end, and the second region corresponds to an intermediate portion between the first side end and the second side end.

17. The method according to claim 15, wherein the mask plate is prepared by a following method:
step S1110: providing a transparent substrate;
step S1120: forming a film medication on the transparent substrate;
step S1130: exposing the film medication with an exposure illuminance gradually decreasing from the first portion to the second portion; and
step S1140: developing the film medication, so that an ultraviolet light transmittance of the film medication decreases gradually from the second portion to the first portion.

18. The method according to claim 15, wherein the mask plate is prepared by a following method:
step S1210: providing a substrate;
step S1220: forming a metal layer on the substrate; and
step S1230: patterning the metal layer by a nanoimprinting method to form a metal wire grid polarizer, direction of metal wire grid of the metal wire grid polarizer gradually changes from a first direction of the first portion to a second direction of the second portion, the first portion corresponds to the first region, the second portion corresponds to the second region, and the first direction intersects the second direction.

19. The method according to claim 18, wherein when the metal wire grid polarizer is irradiated with a polarized ultraviolet light, transmittance of the metal wire grid polarizer gradually increases from the first portion to the second portion.

20. The method according to claim 15, wherein the mask plate comprises a small hole or a slit, and the small hole or the slit is provided corresponding to the second portion.

* * * * *